(12) United States Patent
Ewell, Jr. et al.

(10) Patent No.: US 8,995,945 B2
(45) Date of Patent: *Mar. 31, 2015

(54) MOBILE COMMUNICATOR AND SYSTEM

(75) Inventors: Robert C. Ewell, Jr., Ballston Spa, NY (US); Douglas L. Garmany, Pineland, TX (US); Charles T. Kelly, Houston, TX (US)

(73) Assignee: Mobile Communication Technologies, LLC, Houston, TX (US)

( * ) Notice: Subject to any disclaimer, the term of this patent is extended or adjusted under 35 U.S.C. 154(b) by 408 days.

This patent is subject to a terminal disclaimer.

(21) Appl. No.: 13/221,349

(22) Filed: Aug. 30, 2011

(65) Prior Publication Data

US 2013/0052945 A1 Feb. 28, 2013

(51) Int. Cl.
*H04M 11/04* (2006.01)
*H04W 48/04* (2009.01)
*H04M 1/725* (2006.01)

(52) U.S. Cl.
CPC .......... *H04W 48/04* (2013.01); *H04M 1/72563* (2013.01); *H04M 1/72577* (2013.01); *H04M 2250/10* (2013.01)
USPC .................... 455/404.1; 455/404.2; 455/456.1

(58) Field of Classification Search
USPC ............... 455/404.2, 41.5, 456.4, 456.1, 567, 455/401, 434, 553.1, 521, 161.1–161.3, 455/550.1, 238.1, 441; 342/357.2, 357.22
See application file for complete search history.

(56) References Cited

U.S. PATENT DOCUMENTS

| | | |
|---|---|---|
| 5,844,544 A | 12/1998 | Kahn et al. |
| 5,886,683 A | 3/1999 | Tognazzini et al. |
| 5,892,447 A | 4/1999 | Wilkinson |
| 6,108,532 A | 8/2000 | Matsuda et al. |
| 6,115,607 A | 9/2000 | Holcman |
| 6,282,553 B1 | 8/2001 | Flickner et al. |
| 6,377,813 B1 | 4/2002 | Kansakoski et al. |
| 6,496,703 B1 | 12/2002 | Da Silva |
| 6,556,810 B2 | 4/2003 | Suzuki |
| 6,633,762 B1 | 10/2003 | Brown et al. |
| 6,633,950 B1 | 10/2003 | Brown et al. |
| 6,636,732 B1 | 10/2003 | Boling et al. |
| 6,662,023 B1 | 12/2003 | Helle |
| 6,687,497 B1 | 2/2004 | Parvulescu et al. |
| 6,690,940 B1 | 2/2004 | Brown et al. |
| 6,694,143 B1 | 2/2004 | Beamish et al. |
| 6,771,946 B1 | 8/2004 | Oyaski |
| 6,782,240 B1 * | 8/2004 | Tabe ............................ 455/66.1 |
| 6,823,199 B2 | 11/2004 | Gough |
| 6,871,063 B1 | 3/2005 | Schiffer |

(Continued)

FOREIGN PATENT DOCUMENTS

JP       2005303384 A       10/2005

*Primary Examiner* — Dominic E Rego
(74) *Attorney, Agent, or Firm* — Schmeiser, Olsen & Watts, LLP

(57) ABSTRACT

Disclosed herein is a mobile communicator that includes a speed detection system for determining whether the mobile communicator is moving faster than a threshold speed. The mobile communicator further includes a sleep mode wherein both the speed detection system and a second function of the mobile communicator are disabled. An attempt to use the second function causes the mobile communicator to enable the speed detection system. Further, the mobile communicator includes a disabling circuit configured to disable the second function of the mobile communicator if the speed detection system determines that the mobile communicator is moving faster than the threshold speed.

10 Claims, 2 Drawing Sheets

(56) References Cited

U.S. PATENT DOCUMENTS

| | | | |
|---|---|---|---|
| 6,934,547 B2 | 8/2005 | Suzuki | |
| 6,967,580 B1 | 11/2005 | Schulze | |
| 6,973,333 B1 | 12/2005 | O'Neil | |
| 7,065,349 B2 | 6/2006 | Nath et al. | |
| 7,088,225 B2 | 8/2006 | Yoshioka | |
| 7,113,170 B2 | 9/2006 | Lauper et al. | |
| 7,123,874 B1 | 10/2006 | Brennan | |
| 7,187,953 B2 | 3/2007 | Bauchot et al. | |
| 7,260,390 B1 | 8/2007 | Skinner et al. | |
| 7,308,247 B2 | 12/2007 | Thompson et al. | |
| 7,343,148 B1 | 3/2008 | O'Neil | |
| 7,505,784 B2 | 3/2009 | Barbera | |
| 7,590,405 B2 | 9/2009 | Ewell, Jr. | |
| 7,719,520 B2 | 5/2010 | Singh et al. | |
| 7,762,665 B2 | 7/2010 | Vertegaal et al. | |
| 8,131,848 B1 * | 3/2012 | Denise | 709/224 |
| 8,380,161 B2 | 2/2013 | Ewell, Jr. et al. | |
| 8,385,880 B2 | 2/2013 | Ewell, Jr. et al. | |
| 8,417,268 B1 | 4/2013 | Halferty et al. | |
| 8,538,158 B1 | 9/2013 | Denise | |
| 2001/0051514 A1 | 12/2001 | Lindholm | |
| 2002/0090919 A1 | 7/2002 | Hofman | |
| 2002/0128000 A1 | 9/2002 | do Nascimento, Jr. | |
| 2002/0164979 A1 | 11/2002 | Mooney et al. | |
| 2002/0173301 A1 | 11/2002 | Ikeda | |
| 2002/0193107 A1 | 12/2002 | Nascimento, Jr. | |
| 2002/0198005 A1 | 12/2002 | Hilton et al. | |
| 2003/0045322 A1 | 3/2003 | Baer et al. | |
| 2003/0050039 A1 | 3/2003 | Baba et al. | |
| 2003/0171133 A1 | 9/2003 | Mizuta et al. | |
| 2004/0077339 A1 | 4/2004 | Martens | |
| 2004/0110421 A1 | 6/2004 | Takamura et al. | |
| 2004/0171407 A1 | 9/2004 | Ninomiya | |
| 2004/0176083 A1 | 9/2004 | Shiao et al. | |
| 2004/0198306 A1 | 10/2004 | Singh et al. | |
| 2004/0201520 A1 | 10/2004 | Flick | |
| 2004/0203554 A1 | 10/2004 | Simon | |
| 2004/0204003 A1 | 10/2004 | Soerensen et al. | |
| 2004/0204021 A1 | 10/2004 | Cocita | |
| 2004/0229645 A1 | 11/2004 | Montgomery | |
| 2005/0026644 A1 | 2/2005 | Lien | |
| 2005/0239479 A1 | 10/2005 | Bednasz | |
| 2005/0255874 A1 | 11/2005 | Stewart-Baxter et al. | |
| 2006/0003809 A1 | 1/2006 | Boling et al. | |
| 2006/0066567 A1 | 3/2006 | Scharenbroch et al. | |
| 2006/0099940 A1 | 5/2006 | Pfleging et al. | |
| 2006/0148490 A1 | 7/2006 | Bates et al. | |
| 2006/0240860 A1 | 10/2006 | Benco et al. | |
| 2006/0258376 A1 | 11/2006 | Ewell, Jr. | |
| 2007/0024579 A1 | 2/2007 | Rosenberg | |
| 2007/0072553 A1 * | 3/2007 | Barbera | 455/67.11 |
| 2007/0078552 A1 | 4/2007 | Rosenberg | |
| 2007/0111756 A1 | 5/2007 | Reed | |
| 2007/0164990 A1 | 7/2007 | Bjorklund et al. | |
| 2007/0213092 A1 * | 9/2007 | Geelen | 455/556.1 |
| 2007/0270122 A1 * | 11/2007 | Ewell, Jr. | 455/404.2 |
| 2008/0075056 A1 * | 3/2008 | Thome | 370/342 |
| 2008/0169914 A1 | 7/2008 | Albertson et al. | |
| 2008/0200166 A1 | 8/2008 | McCamon | |
| 2008/0299900 A1 | 12/2008 | Lesyna | |
| 2008/0299954 A1 | 12/2008 | Wright et al. | |
| 2008/0305735 A1 | 12/2008 | Farnsworth et al. | |
| 2008/0316181 A1 | 12/2008 | Nurmi | |
| 2009/0029675 A1 | 1/2009 | Steinmetz et al. | |
| 2009/0055896 A1 | 2/2009 | Aoki et al. | |
| 2009/0117919 A1 | 5/2009 | Hershenson | |
| 2009/0163243 A1 | 6/2009 | Barbera | |
| 2009/0215466 A1 | 8/2009 | Ahl et al. | |
| 2009/0253423 A1 | 10/2009 | Kullberg | |
| 2009/0258676 A1 | 10/2009 | Tanaka | |
| 2009/0270143 A1 | 10/2009 | Bury | |
| 2009/0282127 A1 * | 11/2009 | Leblanc et al. | 709/219 |
| 2009/0295562 A1 | 12/2009 | Shuster | |
| 2010/0009658 A1 | 1/2010 | Wu et al. | |
| 2010/0042911 A1 * | 2/2010 | Wormald et al. | 715/205 |
| 2010/0088047 A1 | 4/2010 | Campbell et al. | |
| 2010/0093405 A1 | 4/2010 | Ewell, Jr. et al. | |
| 2010/0113073 A1 | 5/2010 | Schlesener et al. | |
| 2010/0130170 A1 | 5/2010 | Liu et al. | |
| 2010/0132040 A1 | 5/2010 | Bhagwat et al. | |
| 2010/0156781 A1 | 6/2010 | Fahn | |
| 2010/0182243 A1 | 7/2010 | Singh et al. | |
| 2010/0197351 A1 | 8/2010 | Ewell, Jr. et al. | |
| 2010/0207721 A1 | 8/2010 | Nakajima et al. | |
| 2010/0216509 A1 * | 8/2010 | Riemer et al. | 455/557 |
| 2010/0229217 A1 * | 9/2010 | Bhatia | 726/4 |
| 2010/0248642 A1 * | 9/2010 | Howard et al. | 455/68 |
| 2010/0304712 A1 | 12/2010 | Sweeney et al. | |
| 2010/0323657 A1 * | 12/2010 | Barnard et al. | 455/404.1 |
| 2011/0009107 A1 * | 1/2011 | Guba et al. | 455/418 |
| 2011/0028139 A1 * | 2/2011 | Odom | 455/418 |
| 2011/0065456 A1 | 3/2011 | Brennan et al. | |
| 2011/0082790 A1 | 4/2011 | Baker et al. | |
| 2011/0235443 A1 * | 9/2011 | Lee et al. | 365/189.011 |
| 2011/0244825 A1 | 10/2011 | Ewell, Jr. | |
| 2011/0298924 A1 * | 12/2011 | Miller et al. | 348/148 |
| 2012/0021717 A1 * | 1/2012 | Schmidt | 455/404.2 |
| 2012/0129544 A1 * | 5/2012 | Hodis et al. | 455/456.1 |
| 2012/0129545 A1 * | 5/2012 | Hodis et al. | 455/456.1 |
| 2012/0158918 A1 * | 6/2012 | Leblanc et al. | 709/219 |
| 2012/0166788 A1 * | 6/2012 | Racha et al. | 713/100 |
| 2012/0206254 A1 * | 8/2012 | Morris | 340/439 |
| 2012/0214463 A1 * | 8/2012 | Smith et al. | 455/418 |
| 2012/0231773 A1 * | 9/2012 | Lipovski | 455/414.1 |
| 2012/0244883 A1 | 9/2012 | Tibbitts et al. | |
| 2012/0265977 A1 | 10/2012 | Ewell, Jr. et al. | |
| 2012/0289217 A1 * | 11/2012 | Riemer et al. | 455/418 |
| 2012/0309296 A1 * | 12/2012 | Tieman et al. | 455/39 |
| 2012/0327225 A1 | 12/2012 | Barley et al. | |
| 2013/0035117 A1 * | 2/2013 | Litkouhi et al. | 455/456.4 |
| 2013/0150004 A1 * | 6/2013 | Rosen | 455/414.1 |
| 2013/0252575 A1 | 9/2013 | Ewell, Jr. et al. | |
| 2013/0303143 A1 | 11/2013 | Schrader et al. | |
| 2014/0004840 A1 | 1/2014 | Ewell, Jr. et al. | |
| 2014/0045477 A1 | 2/2014 | Ewell, Jr. et al. | |
| 2014/0118597 A1 | 5/2014 | Tabak et al. | |

* cited by examiner

MOBILE COMMUNICATOR AND SYSTEM

FIELD OF THE DISCLOSURE

The subject matter disclosed herein relates generally to mobile communicators. More particularly, the subject matter relates to a mobile communicator having functionality that is affected by one or more conditions such as speed, and a system including such a mobile communicator.

BACKGROUND OF THE DISCLOSURE

Mobile communicators such as cell phones, BLACKBERRIES®, IPHONES®, netbooks, laptop computers, notepads, GPS devices, personal digital assistants (PDA) and the like are becoming increasingly utilized in today's society. However, these devices may also become an undesirable distraction in many situations. For example, many people choose to use their mobile communicators while driving. Text messaging and emailing functions may be particularly undesirable when driving because a person must constantly utilize at least one hand to input these types of communications, and must often look down to draft a text message. Studies have been undergone which show that this behavior significantly increases the likelihood of causing a traffic accident. Yet, people continue to text message with their mobile communicators while driving with increasing regularity. In light of this, many states attempting to pass legislation aimed at making it illegal to text while driving. However, governmentally regulated penalties alone may not be a sufficient enough deterrent to cause people to drastically change their behavior.

Thus, a mobile communicator having functionality that is affected by one or more conditions, and a system including such a mobile communicator would be well received in the art.

BRIEF DESCRIPTION

According to one aspect, a mobile communicator comprises: a speed detection system for determining whether the mobile communicator is moving faster than a threshold speed; a sleep mode wherein both the speed detection system and a second function of the mobile communicator are disabled, wherein an attempt to use the second function causes the mobile communicator to enable the speed detection system; and a disabling circuit configured to disable the second function of the mobile communicator if the speed detection system determines that the mobile communicator is moving faster than the threshold speed.

According to a second aspect, a mobile communicator comprises: a speed detection system for determining the speed of the mobile communicator; and an accessible data storage location for storing data pertaining to the speed of the mobile communicator over time.

According to a third aspect, a system comprises: a mobile communicator, the mobile communicator including: a first speed detection system for determining the speed of the mobile communicator; a sleep mode wherein both the first speed detection system and a second function of the mobile communicator are disabled, wherein the sleep mode is automatically enabled when the second function is not in use for a predetermined period of time, wherein the sleep mode is automatically disabled when the second function is in use; and a disabling circuit configured to disable the second function of the mobile communicator if the first speed detection system determines that the mobile communicator is moving faster than a threshold speed.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
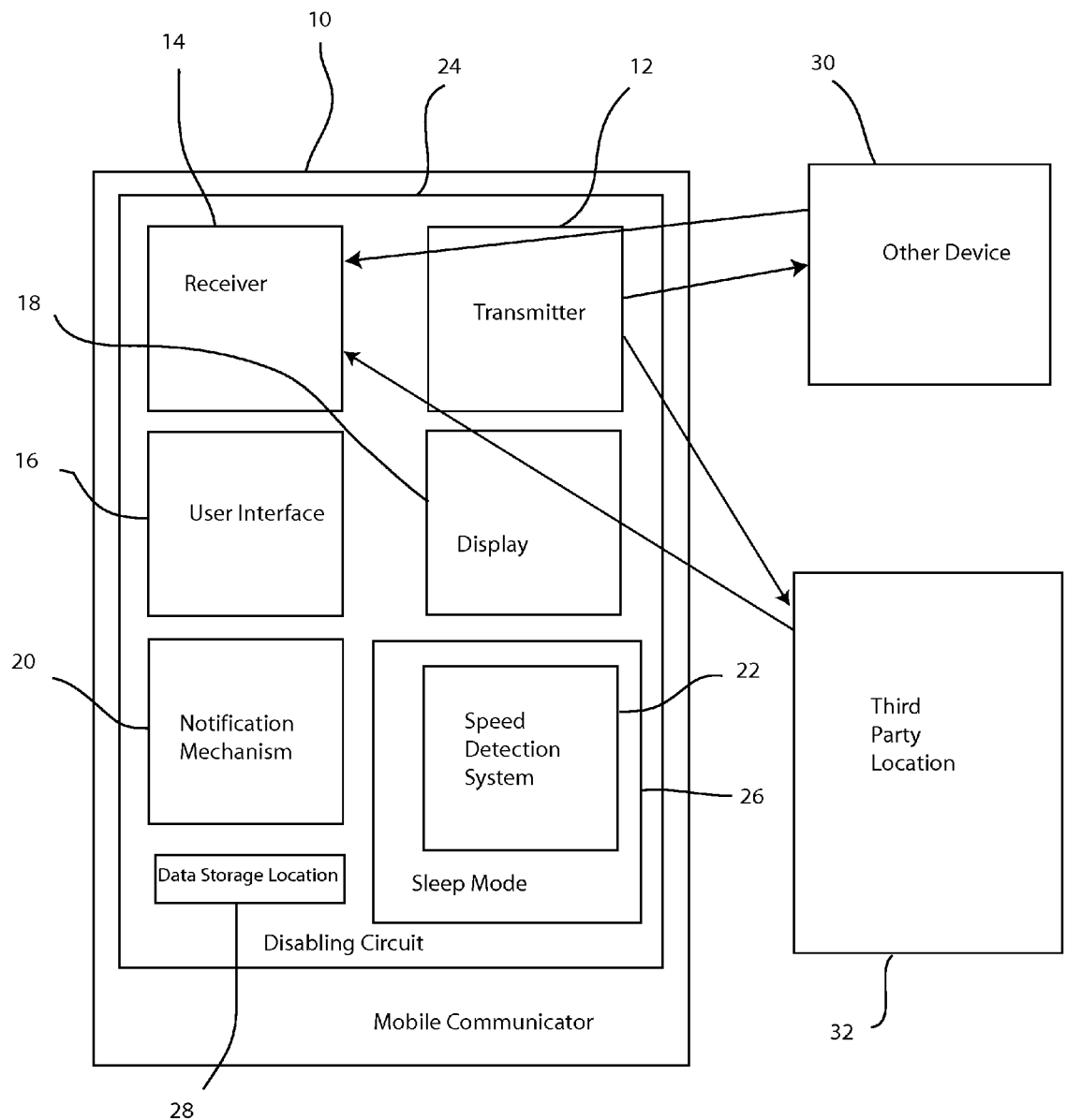
FIG. 1 depicts a schematic representation of a mobile communicator according to one embodiment of the present invention.
Figure 2:
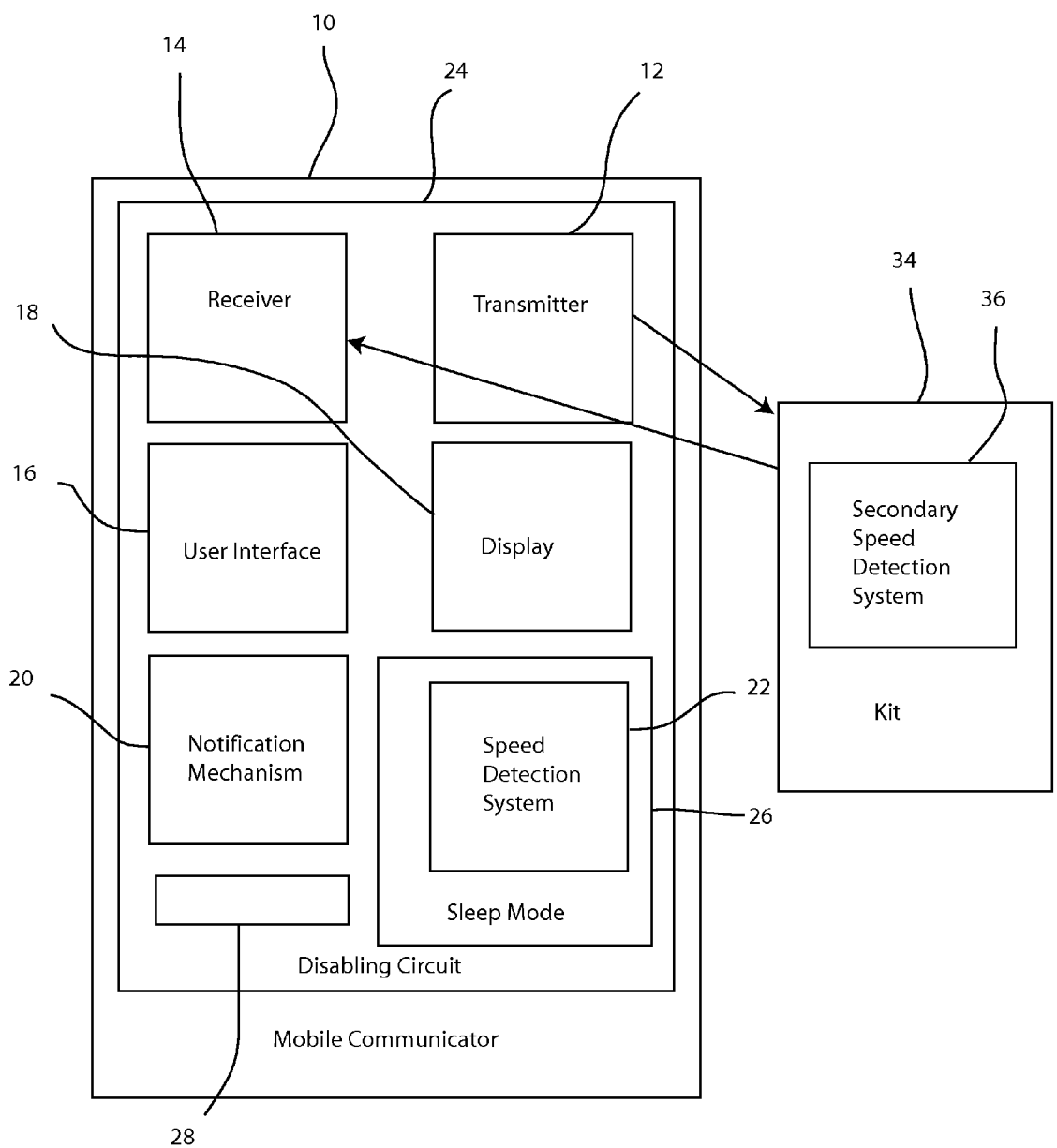
FIG. 2 depicts a schematic representation a mobile communicator according to another embodiment of the present invention.

A detailed description of the hereinafter described embodiments of the disclosed apparatus and method are presented herein by way of exemplification and not limitation with reference to the Figures.

Referring to the Figures, schematic representations of a mobile communicator 10 are shown. The mobile communicator 10 may be a cell phone, DROID®, IPHONE® or BLACKBERRY®. However, in other embodiments the mobile communicator may be a PDA, a netbook, a laptop, a GPS device, a walkee-talkee, tablet, IPAD® or any other mobile communicative device. The mobile communicator 10 may include at least one transmitter 12, at least one receiver 14, at least one user interface 16, at least one display 18, and at least one user notification mechanism 20. The mobile communicator 10 may also include various functions including a text messaging interface, an image messaging interface, a video messaging interface, an internet browser, an image capturer, a voice capturer, a video capturer, a GPS graphical map viewer, a game player, a digital music player, an alarm clock, a digital memo pad, a digital calendar, a two-way radio, an e-book reader, an electronic contact rolodex, a video player, a DVD player, a Blue Ray® player, and a calculator. It should be understood that this list is not exhaustive and that the mobile communicator 10 may include any other functionality that is known to those skilled in the art.

The display 18 of the mobile communicator 10 may be a complex interactive touch-screen that is integrated with the user interface 16. Alternately, the display 18 may be a simple LCD display for presenting information to a user such as a calling number or the number dialed. It should be understood any form of display is contemplated. It should further be understood that the mobile communicator 10 may include a plurality of displays 18.

Likewise, the user notification mechanism 20 of the mobile communicator 10 may be a noise notification element, such as a speaker that emits a ring or "ring-tone" that alerts a user. For example, when the mobile communicator 10 receives a transmission signal, a speaker may emit a pre-programmed audible ring that alerts a user of the incoming transmission. Alternately, the notification mechanism 20 may be a change found on the display 18. For example, the display 18 may light up when a transmission is incoming. Still further, the mobile communicator 10 may vibrate as is known in the art. The user notification mechanism 20 may be any mechanism for alerting a user of a communication event. Additionally, the notification mechanism 20 may be preprogrammed to alert a user of a predetermined event, such as when a time of day is reached (in the case of an alarm clock notification). It should further be understood that the mobile communicator 10 may include a plurality of user notification mechanisms 20.

The user interface 16 may be configured for allowing a user to enter a plurality of identity inputs associated with an alphanumeric combination of numbers and letters. For example, the user interface 16 may be a touch screen, a keyboard, or a simple number pad. Alternately, the user interface 16 may be a voice receiver that allows a user to enter a plurality of identity inputs by voice. In one embodiment, the user interface 16 may be a text messaging interface. In other embodiments, the user interface is a telephone number dialing interface, or an email interface. It should therefore be understood that the mobile communicator 10 may include any type of user interface that would be apparent to those skilled in the art. It should further be understood that the mobile communicator 10 may include a plurality of different user interfaces 16.

The transmitter 12 of the mobile communicator 10 may be in operable communication with the user interface 16 and configured to send a transmission from the mobile communicator 10 to an output device having an identity corresponding with the identity input that is inputted into the mobile communicator 10 via the user interface 16. The transmitter 12 may be configured to communicate typical electromagnetic and/or sonic transmissions such as a cell phone voice transmission, an email, a video or picture message, or a transmission that interacts with the internet. For example, the transmitter 12 may be a network adapter or card that is configured to transmit signals through a router or local area network. Alternately, the transmitter 12 of the mobile communicator 10 may be configured to send a transmission on a $3^{rd}$ or $4^{th}$ generation wireless network. It should further be understood that the mobile communicator 10 may include a plurality of transmitters 12.

Likewise, the receiver 14 of the mobile communicator 10 may be capable of receiving a transmission from a transmitting device. The mobile communicator may be configured to receive any type of transmission such as a cell phone voice transmission, an email, a text, video or picture message, or a transmission from a laptop or computer. For example, the receiver 14 of the mobile communicator may be configured to receive local signals from a router, switch or other local area network. Alternately, the receiver 14 of the mobile communicator 10 may be configured to receive transmissions from $3^{rd}$ or $4^{th}$ generation wireless networks. It should further be understood that the mobile communicator 10 may include a plurality of different receivers 14.

The present invention contemplates that the velocity of the mobile communicator 10 is determinable by at least one speed detection system 22. For example, the mobile communicator 10 may include an internal GPS device for determining velocity. Alternately, the mobile communicator 10 may use another speed detection system such as cell tower triangulation, multilateration, or the like. Further, velocity may be determined by a gyroscope, an accelerometer, or an external way of measuring speed such as a vehicle speed detection system. Thus, the speed of the mobile communicator 10 may be determined internally by the mobile communicator 10 or may be determined by a third party such as a cell phone service provider (not shown).

The mobile communicator 10 may include a disabling circuit 24 that is configured to disable at least one function of the mobile communicator 10 when the speed detection system 22 determines that the mobile communicator 10 is moving at a speed that is greater than or equal to a certain threshold speed. For example, the disabling circuit 24 may be configured to disable the text messaging interface of the mobile communicator 10 when the speed detection system 22 determines that the mobile communicator 10 is moving above the threshold speed. In this embodiment, the mobile communicator 10 may also display a message to the user when the text messaging interface is accessed by a user that tells the user to stop texting or that texting is disabled. The disabling circuit 24 may also be configured to disable any of the receiver 14, the transmitter 12, the user interface 16, the user notification mechanism 20, the display 18 or any of the other various functionalities that the mobile communicator may include, described hereinabove. For example, the disabling circuit 24 may be configured to disable a data input function of the mobile communicator 10 such as a touch screen keyboard or a physical keyboard. Alternately, the disabling circuit 24 may be configured to disable applications that fall into a "text message" category. Examples of these applications may be email, instant messaging, chat applications, or the like. In some embodiments, the disabling circuit 24 may be configured to disable a plurality of these functionalities. For example, the disabling circuit 24 may be configured to disable both a physical keyboard and a display of the mobile communicator 10. Furthermore, the disabling circuit 24 may be configured to disable the preprogrammed functionalities if the speed detection system 22 is tampered with or does not have any determination of speed. For example, in the case that the speed detection system 22 is a GPS and the mobile communicator 10 is moving through a tunnel, the disabling circuit may be configured to disable texting or phone calls despite the fact that there is no speed determination being made by the speed detection system 22.

In one embodiment, the disabling circuit 24 may disable a touch screen keyboard interface on the display 18, or a physical keyboard interface. Thus, a user may not be permitted to type in any input into the mobile communicator 10 when the disabling circuit 24 disables the keyboard interface. For example, if the mobile communicator 10 is an IPHONE®, or DROID® the touch screen keypad may be disabled if the speed detection system 22 determines that the speed is greater than a threshold speed. In the disabled state, the entire touch screen of the mobile communicator 10 may still be active. However, when the speed is greater than a threshold speed, whenever a keyboard would normally appear on the screen to allow for text input, an appropriate message may be displayed that notifies a user, for example, that inputs are not enabled because of the speed that the mobile communicator is traveling at. In other embodiments, the keyboard may still appear on the display 18, but may be disabled so that a pressed key does not result in an input.

The mobile communicator 10 may be configured to enter into a "sleep mode" 26 during which time the speed detection system 22 may be disabled or turned off. The "sleep mode" 26 may be enacted when one or more predetermined functions are not accessed by a user for a predetermined period of time. For example, if the texting interface or the phone transmission interface of the mobile communicator 10 was not in use, the "sleep mode" 26 may disable the GPS speed detection system 22. In one embodiment, the "sleep mode" 26 may automatically occur. For example, whenever a user has not utilized a text messaging function or data input function for a set interval, the mobile communicator 10 may automatically enter into a "sleep mode" 26. The "sleep mode" 26 may last until a user begins to utilize the text messaging function or data input function. In other embodiments, the "sleep mode" 26 may be require a manual input to initiate. For example, a user may manually input that the mobile communicator 10 should enter a "sleep mode" 26. This disables the GPS detection system 22 and also disables at least one function such as text messaging or data input.

In any embodiment, the "sleep mode" 26 may assist in conservation of battery life. When a user attempts to use one of the functions that may be disabled if the speed is above a threshold, the mobile communicator may begin to recover from the "sleep mode" 26 by first enabling the speed detection system 22. The speed detection mechanism 22 may them make a determination whether the mobile communicator 10 is moving above the threshold speed. After the mobile communicator 10 makes this determination, the function either becomes enabled or disabled based on whether the mobile communicator 10 is moving above or below the threshold speed. For example, if the mobile communicator 10 determines that the speed is above the threshold speed, then the function may remain disabled. Alternately, if the mobile communicator 10 determines that the speed is below the threshold speed, then the function may be enabled. Thus, the mobile communicator 10 leaves the "sleep mode" 26. While the mobile communicator 10 is "waking up" from the "sleep mode" 26, the display 18 may include a message that the mobile communicator 10 is "waking up." This may account for and notify a user during any processing time during the wakeup process.

Additionally, the mobile communicator 10 may include a message system that is configured to provide a message to a caller, in the case that the call receiving function is enabled or disabled based on velocity. For example, the mobile communicator 10 may notify a caller with a message such as: "please wait to see if the person you wish to contact is available." Likewise, a template may be created whereby the user of the mobile communicator 10 may create their own message or even send a video to be played for the caller while the system is "waking up." In another embodiment, a link to a commercial website may be established if a person remains unavailable because the mobile communicator is moving at a speed greater than the provided threshold.

Further, a user may choose to place the mobile communicator 10 in a "hands free" mode whereby one or more portions of the disabling circuit 24 may be disabled. For example, when the mobile communicator 10 is in the "hands free" mode, the audible receiving and transmitting functions may be enabled even if these functions would be disabled by the disabling circuit 24 because the mobile communicator 10 is moving at a speed greater than the threshold speed. The "hands free" mode may also be activated by a voice command. Alternately, the "hands free" mode may be activated by placing the mobile communicator 10 in a holster or other kit device. The "hands free" mode may be a mode whereby the mobile communicator 10 accepts inputs via voice commands only. In other words, the "hands free" mode may automatically disable text messaging or data input, or an appropriate user interface of the mobile communicator 10. Additionally, the "sleep mode," described hereinabove, may be activated by the "hands free" mode. In another embodiment, the display 18 may be disabled in the "hands free" mode.

In an alternate embodiment, the mobile communicator 10 may be configured to store a log of when the mobile communicator 10 was moving at a speed that is greater than or equal to a certain threshold speed. This log may be in addition to the functionalities described hereinabove with the disabling circuit 24. Alternately, the mobile communicator 10 may form the log instead of any or all of the functionalities described hereinabove with respect to the disabling circuit 24.

In some embodiments, the log may include information pertaining to which functions were enabled and disabled at various times. Furthermore, the mobile communicator 10 may store data pertaining to when particular functions of the mobile communicator 10 were used and whether the speed detection mechanism 24 had determined that the mobile communicator was moving above and below the threshold speed during the use of those functions. For example, if functions of the mobile communicator 10 are used when the speed detection mechanism 24 determines that the mobile communicator is moving at a speed that is above a certain threshold, the time and nature may be recorded in the log. Furthermore, the mobile communicator 10 may include a data storage location 28 where this log may be stored. Information stored in the log may also be forwarded to another device 30 automatically. For example, the mobile communicator 10 may forward this use to a parentally controlled device, or an owner's head end. Furthermore, the use may be forwarded to a third party location 32 that is accessible by the parent, owner, manager or user. This third party location 32 may indefinitely store the data, preventing a user from being able to erase the data storage location 26 to hide the nonconforming use. However, the data storage location 26 may be designed such that it is tamper proof and difficult or impossible to erase.

In one example using a data storage log, the mobile communicator 10 may be moving above a threshold speed, determined by the speed detection mechanism 24. However, despite this, the user may send a text message, places a phone call, sends an email, or picks up a phone call. Thus, the mobile communicator 10 may automatically store a log of this use in the data storage location 28. The mobile communicator 10 may also send a message the other device 30 a mobile communicator possessed by the parent of the user, thereby notifying the user's parent of the potentially undesirable use. Alternately in the case that the user is an employee, the mobile communicator may forward this use to the manager or employer of the employee. Furthermore, the mobile communicator 10 may forward data pertaining to the use to a third party location.

Moreover, a user, owner, manager, or parent may predetermine what time of day certain functions become enabled or disabled. This may override the speed detection system 22 and the disabling circuit 24. This may also be controlled via a third party web site or source. Thus, a parent may go to the website to activate or deactivate certain functions of the mobile communicator between various times of the day. Furthermore, the mobile communicator 10 may go back to a default setup after a set period of time, thereby ensuring that the owner, parent, manager, or user did not inadvertently have a certain use authorized or unauthorized indefinitely.

Furthermore, a kit 34 may be provided comprising a secondary speed detection system 36 that is independent of the mobile communicator 10. The kit 34 may be connectable to the mobile communicator 10 such that the secondary speed detection system 36, such as a GPS system, determines the speed and forwards this determination to the mobile communicator 10. The kit 34 may be particularly configured such that it sends a signal to disable the speed detection system 22 thereby conserving battery life of the mobile communicator. This signal may be sent wirelessly, with a wired transmission, or any other appropriate transmission. To prevent tampering, the mobile communicator 10 may be required to receive both the disabling signal and the newly acquired speed signal from the secondary speed detection system 36 in order to disable the speed detection system 22 of the mobile communicator 10. It should be understood that the kit 34 may be a holster that the mobile communicator 10 is attachable to or the kit 34 may alternately be completely physically independent from the mobile communicator 10 during this process.

It should be understood that certain functions may be enabled despite other similar functions being disabled. For example, even if the call dialing and receiving functions are disabled, the mobile communicator 10 may enable dialing and receiving to emergency numbers such as 911. Further, after a 911 or other emergency communication, the mobile communicator 10 may also allow all other functions to be enabled for a predetermined period of time to allow follow up communications.

Additionally, when an incoming communication is received by the mobile communicator 10, if the speed detection system 22 determines that the mobile communicator 10 is moving above a certain threshold, the call may be forwarded to another number in addition to being stored on the mobile communicator 10. For example, if a sales representative is on the road and a client tries to contact him, both the sales rep would get a message, but also his office may also get forwarded the communication.

It should be understood that the various functionalities of the mobile communicator 10 described herein may be provided as an inherent property programmed into a mobile communicator such as the mobile communicator 10. Alternately, the embodiments may be provided by one or more downloadable or installable programs, applications or other software. These applications, downloadable or installable programs or other software may turn a typical mobile communicator into the mobile communicator 10 having one or more embodiments of the present invention, described hereinabove. Furthermore, the embodiments may be provided by hardware installed or attached to the mobile communicator 10. Furthermore, various methods are also contemplated to accomplish the various embodiments of the mobile communicator 10 described herein.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A mobile communicator comprising:
   a speed detection system for determining whether the mobile communicator is moving faster than a threshold speed;
   a sleep mode wherein the speed detection system of the mobile communicator is disabled, wherein the sleep mode is enacted when a text input interface is not accessed by a user for a predetermined period of time; and
   a disabling circuit configured to disable the text input interface of the mobile communicator if the speed detection system determines that the mobile communicator is moving faster than the threshold speed.

2. The mobile communicator of claim 1, wherein the speed detection system is an internal GPS device.

3. The mobile communicator of claim 1, wherein the sleep mode is automatically entered into by the mobile communicator after a user does not attempt to use the text input interface for a predetermined period of time.

4. The mobile communicator of claim 1, wherein the sleep mode is manually entered into by a user.

5. The mobile communicator of claim 1, wherein the attempt to use the text input interface causes the mobile communicator to enable the speed detection system, wherein the text input interface remains disabled if the speed detection system determines that the mobile communicator is moving faster than the threshold speed.

6. The mobile communicator of claim 1, further comprising a notification system that is configured to notify a user when the mobile communicator is in the sleep mode and when the mobile communicator is being awakened from the sleep mode.

7. The mobile communicator of claim 1, further comprising a message system that is configured to provide a message to a caller that the text input interface is disabled.

8. The mobile communicator of claim 1, further comprising an accessible data storage location for storing data pertaining to the speed of the mobile communicator over time.

9. A system comprising:
   a mobile communicator, the mobile communicator including:
      a first speed detection system for determining the speed of the mobile communicator;
      a sleep mode wherein the first speed detection system of the mobile communicator is disabled, wherein the sleep mode is automatically enabled when a text input interface is not in use for a predetermined period of time, wherein the sleep mode is automatically disabled when the text input interface is in use; and
      a disabling circuit configured to disable the text input interface of the mobile communicator if the first speed detection system determines that the mobile communicator is moving faster than a threshold speed.

10. The mobile communicator system of claim 9, further comprising a kit that includes a second speed detection system, wherein the mobile communicator is connectable to the kit such that the secondary speed detection system is configured to determine the speed of the mobile communicator and forward the determination to the mobile communicator, wherein the kit further disables the first speed detection system when the mobile communicator is connected.

* * * * *